United States Patent [19]

Farrell

[11] 4,088,432

[45] May 9, 1978

[54] MOLD LOCKUP MECHANISM

[75] Inventor: Robert E. Farrell, Springfield, Mass.

[73] Assignee: Package Machinery Company, East Longmeadow, Mass.

[21] Appl. No.: 773,300

[22] Filed: Mar. 1, 1977

[51] Int. Cl.² .......................... B29F 1/00; B30B 1/16; B29C 3/06
[52] U.S. Cl. ............................... 425/451.6; 425/150; 425/593
[58] Field of Search ....... 425/451.5, 451.6, DIG. 220, 425/DIG. 223, 388, 3

[56] References Cited

U.S. PATENT DOCUMENTS

| | | | |
|---|---|---|---|
| 2,498,264 | 2/1950 | Goldhard | 425/DIG. 222 |
| 3,452,399 | 7/1969 | Blumer | 425/3 |
| 3,632,272 | 1/1972 | Herbener | 425/451.6 X |
| 3,667,890 | 6/1972 | Rusmini | 425/DIG. 220 |

*Primary Examiner*—J. Howard Flint, Jr.

*Attorney, Agent, or Firm*—McCormick, Paulding & Huber

[57] ABSTRACT

An injection molding machine has two stationary platens interconnected by tie bars and an immediate third platen which is movable on the tie bars. Separable mold portions are mounted respectively on one of the stationary platens and the third platen so that reciprocating movement of the third platen along the tie bars opens and closes the mold portions. A pair of toggle linkage mechanisms positioned at opposite sides of the machine and connecting with the movable third platen and one of the other platens are used to lockup the mold portions when the linkages assume their toggle positions. To move the toggle mechanisms into the toggle positions, a crosshead on slide rods connects with the mechanisms and is pushed away from the third platen at lockup by two piston and cylinder assemblies extending between the platen and the crosshead. The positioning of the cylinders and crosshead minimizes the overall length of the molding machine and permits mold lockup to be triggered more accurately.

15 Claims, 5 Drawing Figures

MOLD LOCKUP MECHANISM

BACKGROUND OF THE INVENTION

The present invention involves a molding machine which utilizes toggle linkage mechanisms to develop the necessary mold lockup forces. More particularly, the present invention involves a molding machine which is improved by virtue of a molding machine which is improved by virtue of a smaller overall size and cost and a high sensitivity for triggering lockup.

Prior art molding machines as shown in U.S. Pat. No. 3,452,399 have used different sets of actuating mechanisms for large scale motions of the mold portions and mold lockup, even though a single actuating means of suitable size could be used for both purposes. The advantages of using separate actuating mechanisms can be attributed to the grossly different requirements for a mold closing system and a mold lockup system. Generally, the mold closing system must produce large scale displacements with relatively small forces while, on the other hand, the lockup system must produce relatively small displacements, but large lockup forces.

In the prior art machines such as shown in U.S. Pat. No. 3,452,399, the actuator for the lockup mechanism is situated along the central axis of the machine and actuates a pair of symmetrically disposed toggle linkages which are brought into operation after traversing actuators have produced the large scale movements that bring the mold portions into engagement. Since the lockup actuator which is a piston and cylinder assembly extends between a stationary platen and the toggle mechanisms, a large displacement of the piston in the assembly is needed to accommodate the movement produced by the mold traversing actuators and the actuator projects a substantial distance rearwardly of the machine. The projecting actuator greatly increases the overall length of the machine. In addition, the fluid capacity of the machine is increased and the various components such as pumps, coolers and filters must be increased to handle the higher capacity. All of the increases in size correspond to increased cost of the machine.

The lockup mechanism for a thermoforming machine illustrated in U.S. Pat. No. 3,632,272 employs two toggle mechanisms which are actuated by a piston and cylinder assembly. Protrusion of the actuating assembly is avoided by connecting the cylinder between a crosshead joined to the toggle mechanisms and the moving platen which is locked by the toggle mechanisms. Additionally, however, the total displacement of the moving platen is relatively limited since the thermoforming process is carried out with sheets and the resulting product does not require large clearances to be removed from the mold.

Accordingly, it is a general object of the present invention to provide a molding machine which has a reduced cost and overall length and which at the same time can be accurately triggered to produce lockup forces at the appropriate time.

SUMMARY OF THE INVENTION

The present invention resides in a molding machine which employs a toggle linkage to develop mold lockup forces when the mold is closed. The molding machine comprises first and second stationary platens and an intermediate third platen which is movable back and forth between the other platens for opening and closing the mold. Separable mold portions are mounted respectively on the first stationary platen and the third movable platen for molding an article while the mold is closed and dispensing the molded article from the machine when the mold is open.

A toggle linkage mechanism is connected between the second stationary platen and the movable third platen for developing lockup forces between the mold portions. The toggle mechanism includes a front linkage connected to the third platen and a rear linkage connected to the second platen pivotally joined to the front linkage. The front and rear linkages move toward a toggle position when the mold portions close and thereby develop the lockup forces.

A movable crosshead positioned between the second and third platens is operatively connected with the front and rear linkages of the toggle mechanism to move the linkages in and out of the toggle position. The crosshead is situated so that it moves away from the third platen and toward the second platen to place the front and rear linkages in the toggle position. Thus, the motion of the crosshead is in a direction opposite to the third platen as lockup forces are developed. Actuating means connected between the moving third platen and the crosshead urge the crosshead away from the third platen when lockup is desired.

Movement of the crosshead away from the third platen during lockup makes the determination of mold closing easier because the distance between the crosshead and third platen increases rapidly as the toggle position is approached. A foreign object between the mold portions can be detected with greater sensitivity at closure because of the rapid change of crosshead position. Furthermore, the lockup actuating means positioned between the crosshead and third platen reduces the overall length of the molding machine.

DESCRIPTION OF THE PREFERRED EMBODIMENTS

Figure 1:
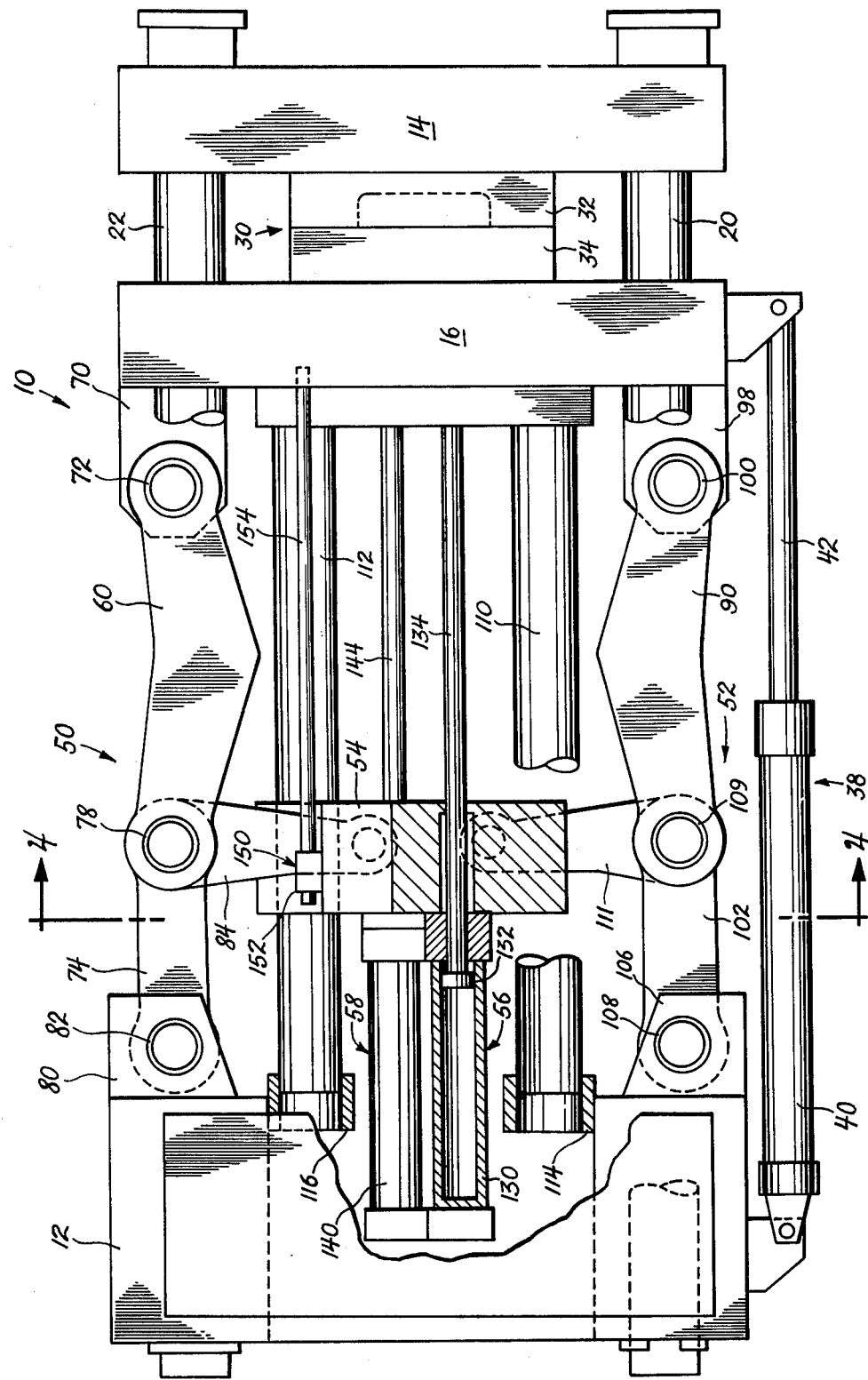
FIG. 1 is a side elevation view of a molding machine embodying the present invention with the mold closed in the lockup position.

FIG. 1 illustrates generally an injection molding machine incorporating the novel lockup mechanism of the present invention. While an injection molding machine has been selected to illustrate the invention, the injection mechanism forms no part of the invention and any type of mold machine including a thermoforming machine or a die-casting machine may incorporate the invention as well.

The molding machine, generally designated 10, includes a stationary rear platen 12, a stationary front platen 14 and a movable platen 16 which is interposed between the stationary platens 12 and 14. Four equally spaced tie bars 20, 22, 24 and 26 interconnect the two end platens 12 and 14 and hold the end platens in fixed relationship with one another while the movable platen is slidably mounted on the tie bars for reciprocating movement relative to the stationary platens. An article-forming mold 30 is attached to the platens 14 and 16, and in its simplest form the mold is comprised of two mold halves 32 and 34 mounted respectively on the platens 14 and 16. In conventional fashion the mold halves are aligned with one another along a central axis of the machine extending parallel to the tie bars and are moved by the platens 14 and 16 between a closed position illustrated in FIG. 1 and an open position illustrated in FIG. 2. During the period of time in which the molds are closed, a charge of settable material is injected through the platen 14 into the mold cavity which defines the shape of a desired article, and such article is removed from the mold by appropriate knockout equipment (not shown) while the mold halves are open. Since the injection and molding mechanism forms no part of the present invention, further description is not given; however, it is to be understood that in order to properly form an article, it is desirable to have the mold halves 30 and 32 pressed tightly together or locked up during the interval in which the settable material is injected and set. The present invention is accordingly addressed to the lockup mechanism which provides this function.

In order to produce large scale closing and opening movement of the platen 16 relative to the stationary platens 12 and 14, a traversing actuator in the form of an extendible piston and cylinder assembly 38 is connected between the platen 12 and 16. The cylinder 40 is connected at one end to the stationary platen 12 while the piston rod 42 is connected to the moving platen 16. It will be noted that the assembly is mounted in the lower portion of the machine 10 below the central axis as shown in FIG. 1. Such offset mounting develops unbalanced forces on the moving platen as it reciprocates, but two toggle linkage mechanisms 50 and 52 and a crosshead 54 described below act to a large degree to maintain the third platen parallel to the first platen. If such forces were a problem, another piston and cylinder assembly could be readily added at the opposite side of the machine to balance the moments. Extension and retraction of the piston rod by means of an appropriate hydraulic or pneumatic fluid is synchronized with the other operations of the cyclic molding process.

The piston and cylinder assembly 38 is not utilized to develop the lockup forces between the mold halves 32 and 34 and thus the assembly is not a high force output assembly. Instead, the assembly primarily provides displacement. Since the assembly 38 is not needed to develop high lockup forces, its size and, in particular, its piston area may be relatively small. Correspondingly, the overall volume of the fluid actuating system which energizes the various components of the machine need not be sized to handle large volumes of fluid, and the overall cost of the machine is correspondingly reduced.

The lockup mechanism of the present invention employs the two symmetrically disposed toggle linkage mechanisms 50 and 52, the crosshead 54 for operating the toggle mechanisms simultaneously and two parallel fluid actuators comprised of extendible piston and cylinder assemblies 56 and 58 similar to the assembly 38.

The upper toggle mechanism 50 as shown in the top plan view has four front links 60, 62, 64 and 66 pivotally connected at their front ends with the movable platen 16 by means of dual lugs 70 and a connecting pin 72. The mechanism 50 also has two rear links 74, 76 which are pivotally connected to the front links by means of a connecting pin 78 and to the stationary platen 12 at the rear by means of triple lugs 80 and a connecting pin 82.

The toggle mechanism is completed by a single, pivotal leaf or crosshead link 84 extending between the crosshead 54 and the connecting pin 78 at the junction of the front and rear links.

The lower toggle linkage mechanism 52 is constructed in the same manner as the mechanism 50 and includes a forward set of links 90, 92, 94 and 96 pivotally connected to the movable platen 16 by means of dual lugs 98 and a pivot pin 100, a rear set of links 102, 104 pivotally connected to the stationary platen 12 by means of triple lugs 106 and a pivot pin 108 and to the forward links by a pivot pin 109, and a leaf link 111 connecting the crosshead 54 with the forward and rear links at the junction established by the pin 109.

It will be observed that all of the pins interconnecting the links of the toggle mechanisms are placed in double shear so that unbalanced movements are not generated when the high lockup forces are developed at the toggle position.

The crosshead 54 is mounted for sliding movement between the stationary platen 12 and the movable platen 16 on two slide rods 110 and 112.

Figure 4:
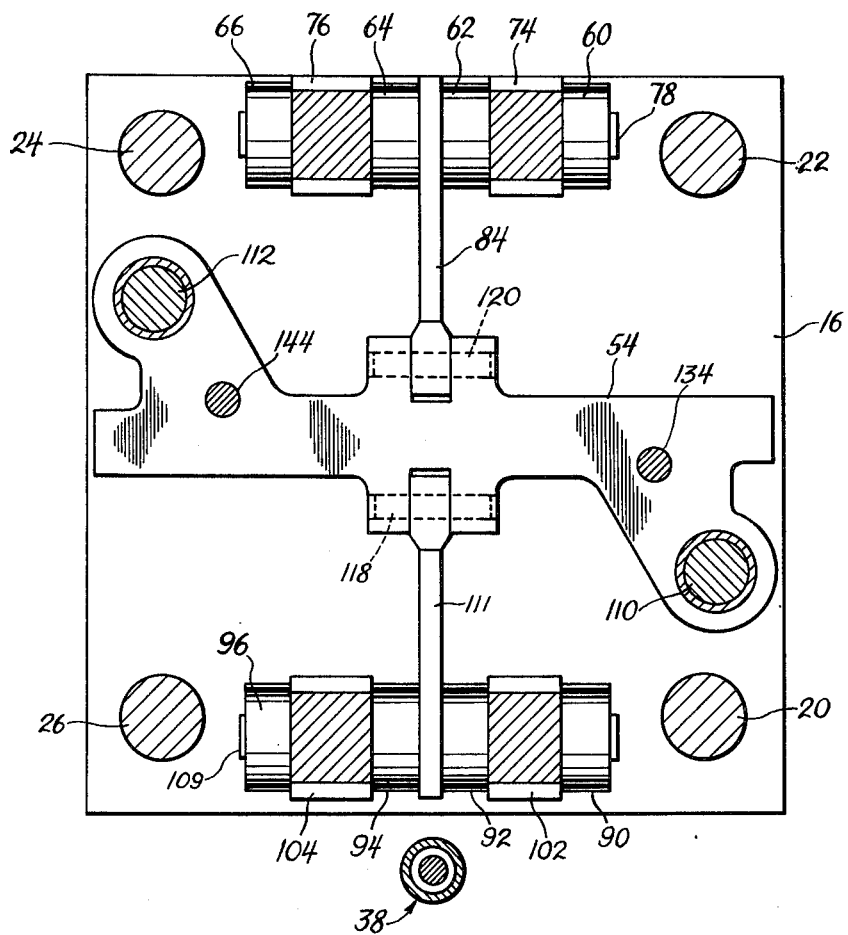
FIG. 4 is a sectional view of the molding machine as seen along the sectioning line 4—4 in FIG. 1.

The slide rods are fixedly attached at their forward ends to the movable platen 16 and slide in bushings 114 and 116 respectively attached to the stationary platen 12. Thus, as the platen 16 moves back and forth on the tie bars relative to the stationary platen 14, the slide rods move relative to the bushings 114 and 116. The offset or diagonal positioning of the slide rods in the crosshead is illustrated most clearly in FIG. 4 together with the connecting pins 118 and 120 which join the leaf links 84 and 111 to the center of the crosshead.

Figure 5:
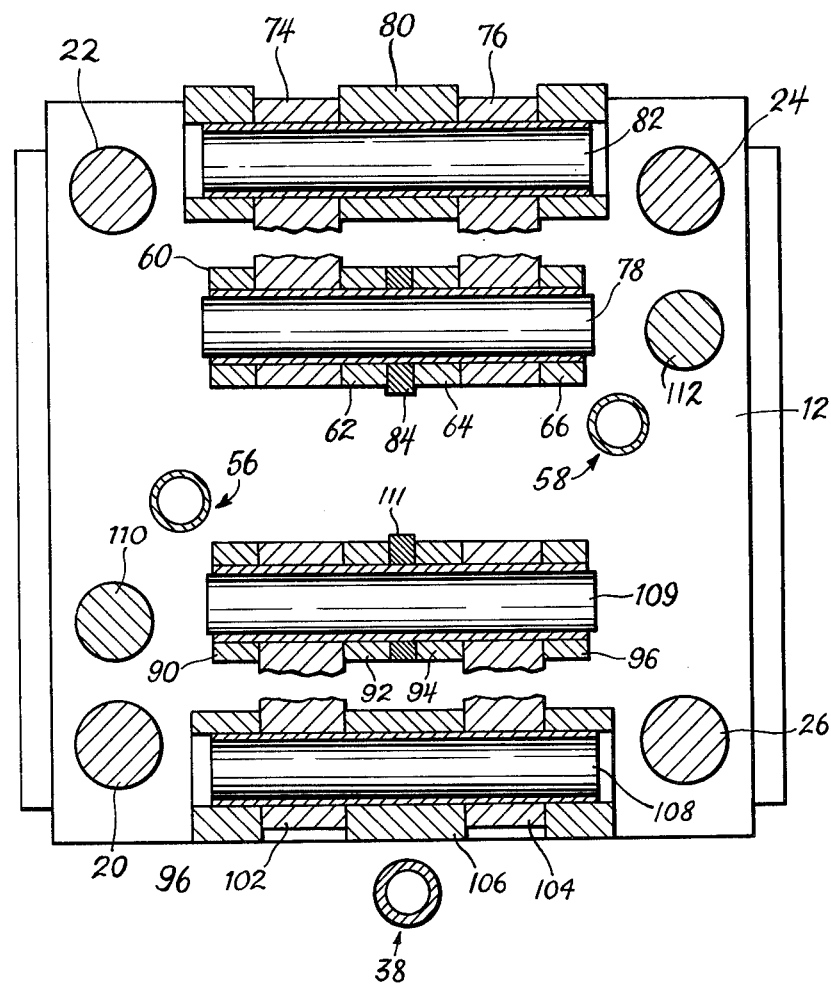
FIG. 5 is a sectional view of the molding machine as viewed along the sectioning line 5—5 of FIG. 2.

The piston and cylinder assemblies 56 and 58 are also diagonally disposed at opposite sides of the crosshead 54 as indicated in FIG. 5 and serve as the actuating means for controlling the position of the crosshead relative to the movable platen 16. Correspondingly, the assemblies control lockup and unlocking of the molding portions 32 and 34 by way of the crosshead and toggle mechanisms 50 and 52. Since the assemblies have the same construction, only assembly 56 is illustrated in section in FIG. 1.

The assembly 56 extends between the crosshead 54 and the movable platen 16 and has a cylinder 130 fixedly attached to the crosshead. An unbalanced piston 132 having the larger effective area facing the stationary platen 12 reciprocates back and forth within the cylinder in response to fluid pressures developed within the cylinder. A piston rod 134 extends from the piston through the crosshead and is fixedly attached to the movable platen 16. In a similar manner, the assembly 58 has a cylinder 140, an unbalanced piston (not visible) within and a piston rod 144 connected between the piston and the movable platen 16.

OPERATION

Figure 2:
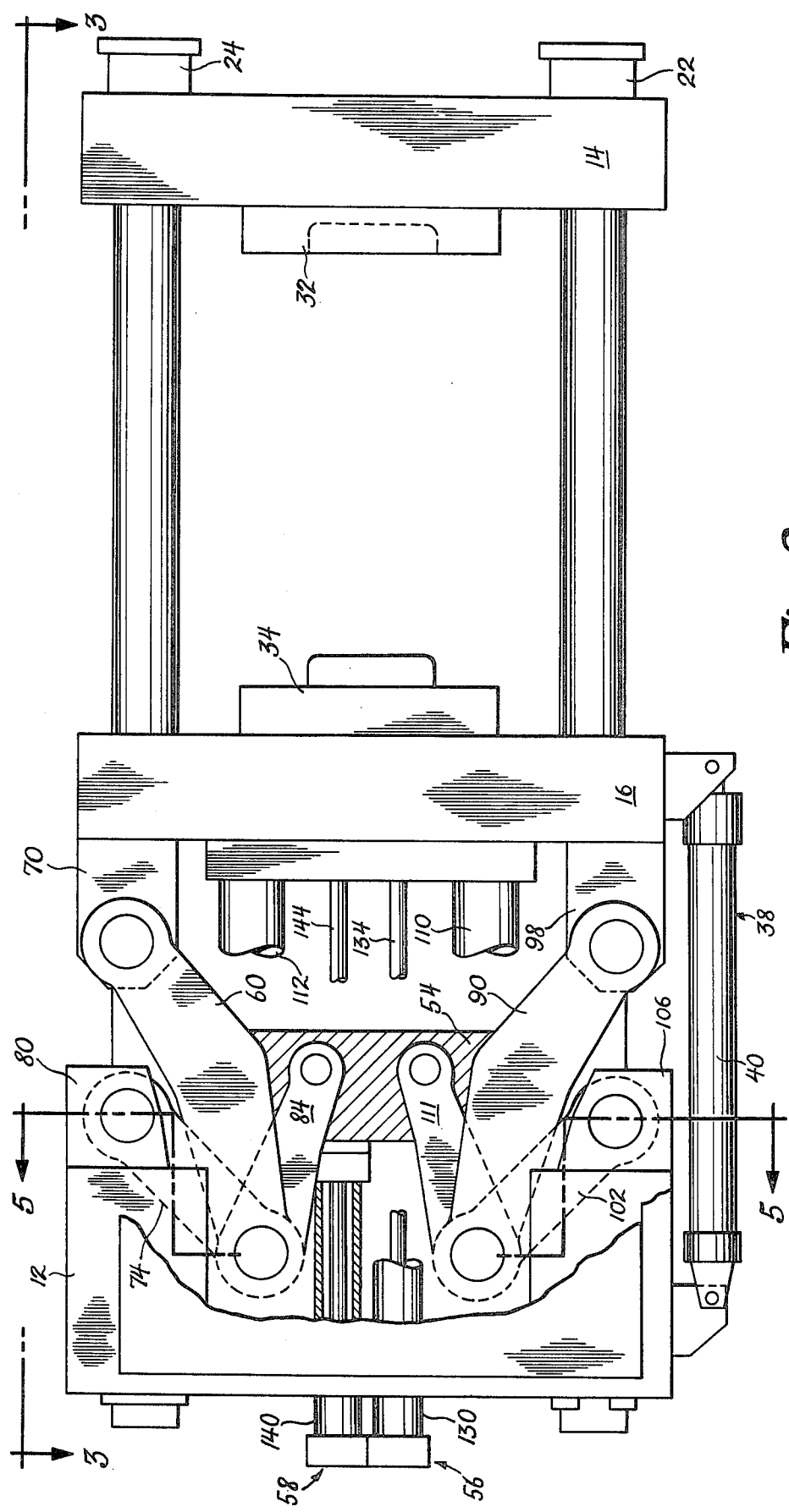
FIG. 2 is a side elevation view of a molding machine in FIG. 1 with the mold in the open position.
Figure 3:
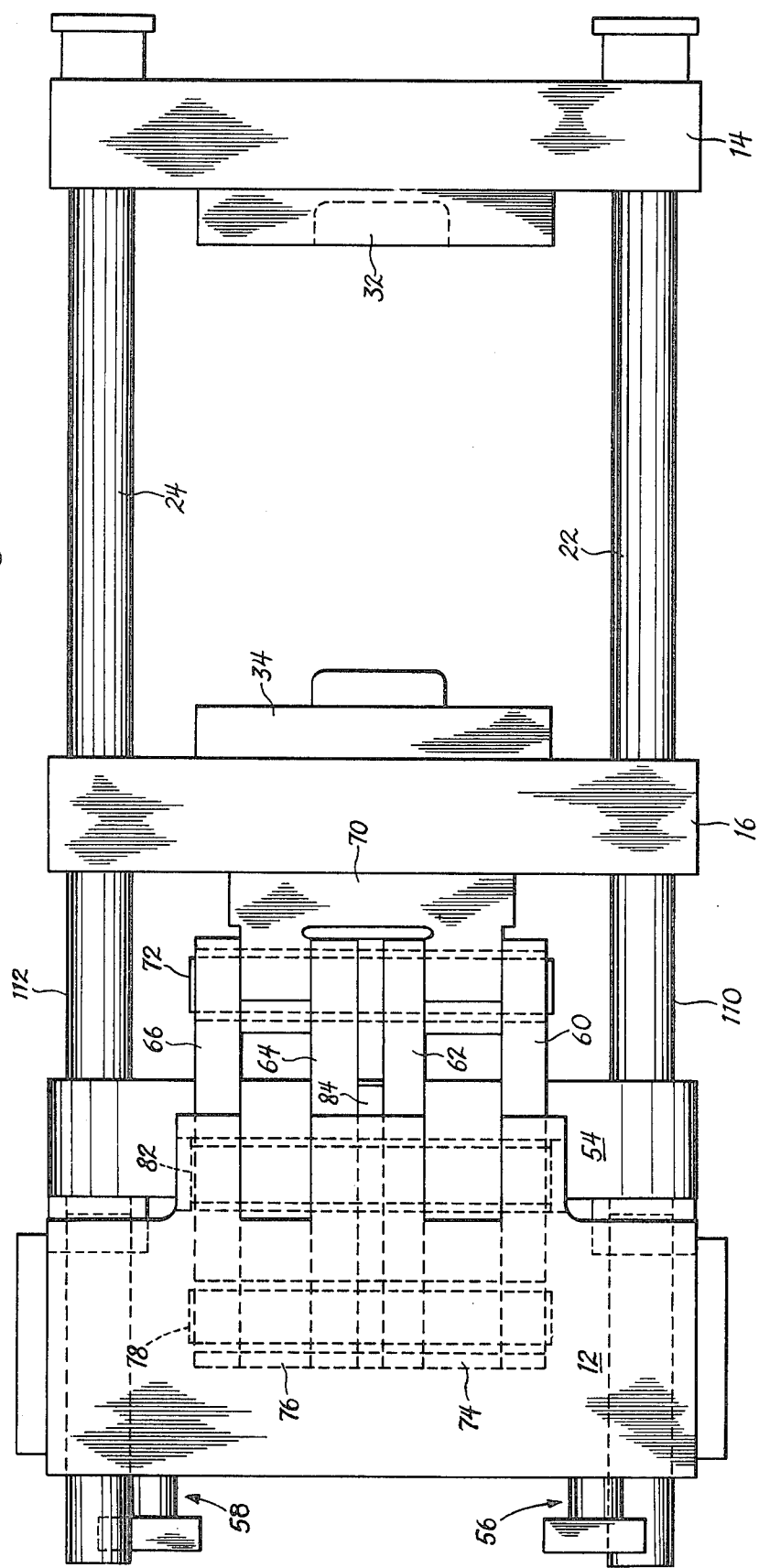
FIG. 3 is a top plan view of the molding machine with the mold open.

At the beginning of a molding operation, the platens 14 and 16 are spread as illustrated in FIG. 2 so that the mold portions 30 and 32 are open. The piston and cylinder assembly 38 is then actuated to move the platen 16 toward the stationary platen 14 and place the mold portions 30 and 32 in the moldclosed position shown in FIG. 1. During movement of the platen 16, the control valves regulating the piston and cylinder assemblies 56 and 58 are in a by-pass situation. By maintaining a slightly positive pressure on the fluid system which energizes these assemblies, system fluid merely fills the cylinders without developing significant retarding or output forces until the mold 30 is closed. Due to the geometry of the toggle mechanisms, the crosshead 54 initially moves closer to the platen 16 as both the platen and crosshead advance toward the stationary platen 14 from the position illustrated in FIG. 2. However, when the rear linkages of both mechanisms reach a position perpendicular to the central axis of the machine, the crosshead 54 begins to move slower than the platen 16 and accordingly the distance between the crosshead and platen increases thereafter. As the lockup position of FIG. 1 is approached, the toggle mechanisms 50 and 52 move into the illustrated toggle positions and the relative motion of the crosshead away from the moving platen 16 increases substantially. The rapid increase in such relative motion makes the mold-closed position readily detectable with high sensitivity by means of a position sensing means 150 extending between the crosshead and moving platen 16.

In one form the sensing means may include a limit switch 152 mounted on the crosshead and an operating rod 154 fixedly attached to the moving platen 16. As the platen 16 reaches the mold-closed position, a detent on the rod 154 trips the limit switch 152 and provides a triggering signal for energizing the lockup assemblies 56 and 58. The high velocity movement of the crosshead 54 away from the platen 16 provides a more sensitive parameter for determining when the mold portions are closed than the movement of the platen 16 on the tie bars because of the greater rate of change of the relative movement at the critical position.

The relative movement of the crosshead initially toward the platen 16 reduces the required displacement of the pistons within the assemblies 56 and 58 so that the stroke and corresponding size of the cylinder assemblies 56 and 58 can be less than the total displacement of the moving platen 16. Correspondingly, a further reduction of the fluid system which operates the assemblies 38, 56 and 58 is permitted.

When the mold portions 30 and 32 have made contact or "kissed" and such contact is detected by the sensor 150, the assemblies 56 and 58 are energized simultaneously to push the crosshead 54 farther away from the platen 16 and at the same time positively urge the toggle mechanisms 150 and 152 into the toggle position. As the mechanical advantage of the toggle mechanisms approaches infinity at the toggle position, very high lockup loads are developed through the front and rear linkages and the tie bars connecting the stationary platens 12 and 14 and reacting the lockup loads are stretched in tension. At this point, the molds are locked up and a settable material may be injected into the cavity of the mold 30 through the stationary platen 14.

After the injection step, pressure within the cylinder assemblies 56 and 58 is reversed to insure that the toggle mechanisms are pulled out of the toggle position. Sufficient forces are also developed by the assemblies through the linkages to pull the mold portions 30 and 32 apart with a molded article within and thus break the mold open. Simultaneously or shortly thereafter, the piston and cylinder assembly 38 is actuated to generate the large scale displacement which moves the platen 16 to the mold open position illustrated in FIG. 2. As the assembly 38 begins to translate the platen 16 toward the stationary platen 12, the lockup assemblies 56 and 58 are again placed in by-pass so they do not impede the opening operation.

It will be noted that the unbalanced pistons in the lockup assemblies 56 and 58 develop their greatest output force during lockup of the injection mold 30. Correspondingly, the forces developed by the assemblies when the mold is open are less due to the smaller effective areas of the pistons being utilized. The different magnitudes and relative values of the forces available from the cylinder assemblies are ideally suited to the injection molding machine because the lockup force required is greater than the mold-breaking force. The correspondence of the required force and the available force of the assemblies 56 and 58 enables the assemblies to be scaled to the task which they perform and utilizes their capacities most efficiently in both the lockup and mold-breaking operations. Such scaling eliminates the need for oversize piston and cylinder assemblies and minimizes the capacity of the fluid system that operates the assemblies. The attainment of appropriately scaled assemblies is possible primarily because of the crosshead 54 moves away from the platen 16 during the lockup operation which should be contrasted with the corresponding movement that occurs in the prior art patent 3,632,272 referenced above. Concurrently, a reduction in the overall length of the molding machine is achieved by connecting the lockup cylinder assemblies between the moving platen 16 and the moving crosshead. It will be noted in the illustrated machine that the assemblies even in the open position of the mold in FIG. 2 do not project substantially beyond the stationary platen 12.

Accordingly, an injection molding machine having an improved lockup mechanism has been disclosed. The lockup mechanism does not significantly extend the overall length of the machine beyond the stationary end platens as in many of the prior art structures, and due to the manner in which the locking mechanism functions, actuators of minimize size are used most efficiently to perform the mold lockup and opening functions. An overall cost saving is obtained by corresponding reductions in the size of components and quantity of materials which comprise the machine.

While the present invention has been described in a preferred embodiment, it should be understood that numerous modifications and substitutions can be had. For example, each toggle linkage mechanism illustrated utilizes two sets of front and rear linkages with two front links in each set. It will be readily apparent that forces between the stationary and movable platens can be developed with a lesser number of links. While two different actuating assemblies 56 and 58 have been mounted in diagonally offset relationship on the crosshead 54, a single cylinder centrally mounted in the head might also be employed. Reference to the toggle position in connection with the invention is intended to comprehend not only the condition in which the front and rear linkages are in alignment but also the condition in which the linkages are intentionally restricted within a few degrees of alignment to avoid over-center locking of the linkages. Accordingly, the present invention has been described in a preferred embodiment by way of illustration rather than limitation.

I claim:

1. A molding machine comprising: first and second stationary end platens and a third movable platen between the end platens and reciprocable toward and away from the first end platen, separable mold portions mounted respectively on the first stationary platen and the third movable platen for molding an article when the first and third platens are moved close together and the mold portions are closed and locked up, a toggle linkage mechanism interposed between the second stationary platen and the movable third platen for locking up the mold portions when the first and third platens are close together, the toggle mechanism extending between the second and third platens and including a front linkage pivotally connected to the third movable platen and a rear linkage pivotally connected to the second stationary platen and having a pivotal joint with the front linkage, the toggle mechanism being operable to move toward a toggle position and press the mold portions closed and locked up and operable to move away from the toggle position and pull the mold portions open; a movable crosshead operatively connected with the front and rear linkages of the toggle mechanism to move the linkages in and out of the toggle position, the crosshead with the mold portions open being positioned between the second and third platens and between the third platens and the pivotal joint of the front and rear linkages, and with the mold portions closed for lockup being movable away from the third platen and toward the second platen to move the front and rear linkages into the toggle position; and actuating means connected to the crosshead for urging the crosshead away from the third platen and moving the linkages into the toggle position for lockup.

2. A molding machine as defined in claim 1 wherein the actuating means is an actuator extending between the third platen and the crosshead.

3. A molding machine as defined in claim 1 wherein the actuating means comprises an extendible piston and cylinder assembly connected between the moving third platen and the crosshead for urging the crosshead away from the third platen as the toggle position of the front and rear linkages is approached.

4. A molding machine as defined in claim 3 wherein the piston and cylinder assembly has an unbalanced piston.

5. A molding machine as defined in claim 4 wherein the piston and cylinder assembly has an extended and a retracted condition and is mounted between the third platen and the crosshead to assume the extended condition when the mold portions are locked up and a retracted position when the mold portions are open.

6. A molding machine as defined in claim 1 wherein:
the toggle mechanism further includes a leaf linkage connected between the crosshead and the junction of the front and rear linkages to establish an operational connection between the crosshead and the toggle mechanism.

7. A molding machine as defined in claim 6 wherein the actuating means is a reversible actuating means for moving the crosshead toward and away from the third platen and correspondingly moving the front and rear linkages of the toggle mechanism into and out of the toggle position.

8. A molding machine as defined in claim 1 further including traversing means connected between the moving third platen and one of the other platens for moving the first and third platens relative to one another and the mold portions between open and closed positions.

9. A molding machine as defined in claim 1 further including sensing means for the actuating means, the sensing means including a sensor connected between the crosshead and the third movable platen for sensing relative movement of the crosshead and third platen as the mold portions close.

10. A molding machine as described in claim 1 wherein the toggle linkage mechanism is one of two toggle linkage mechanisms extending between the second and third platens and being symmetrically disposed about a central axis of the molding machine extending through the platens.

11. A molding machine as defined in claim 10 wherein the crosshead is disposed between the two toggle mechanisms and is connected to each of the mechanisms.

12. A molding machine as defined in claim 11 wherein the actuating means comprises two piston and cylinder assemblies operatively connected between the crosshead and the movable third platen, the assemblies being parallel with and symmetrically disposed about the central axis of the machine.

13. A molding machine as defined in claim 1 wherein a set of guide bars extend between the second and third platens; and the crosshead is mounted on the guide bars for movement between the second and third platens.

14. An injection molding apparatus comprising:
a first and a second stationary platen situated at opposite ends of the machine and fixedly interconnected by a set of tie bars;
a third platen mounted on the tie bars for reciprocation on the bars parallel to a central machine axis between the first and second platens;
an injection mold having at least two separable, mating mold portions mounted respectively on the first and third platens for movement between mold open and mold closed positions with the relative movement of the first and third platen along the central machine axis;
two toggle mechanisms disposed on opposite sides of the machine axis, each mechanism extending between and being connected to the second platen and the third platen and assuming a toggle position for locking up the mold when the first and third platens have moved the mold portions into the mold closed position, the mechanisms also being movable out of the toggle position to spread the first and third platens and pull the mold portions open;
a crosshead mounted between the second and third platens and within the two toggle mechanisms and connected with the respective mechanisms for actuating the mechanisms into and out of the toggle positions, the crosshead being positioned farther from the movable third platen in the toggle position than in the non-toggle position;
a piston and cylinder assembly extending between the crosshead and the third platen and operative to move the crosshead relative to the third platen to actuate the toggle mechansims; and
another piston and cylinder assembly connected between the second and third platens for large scale movements of the third platen and the mold portion attached thereto.

15. An injection molding apparatus as defined in claim 12 wherein the piston and cylinder assembly between the crosshead and third platen includes an unbalanced piston and piston rod movable between an extended and retracted position relative to a cylinder, and the assembly is mounted between the crosshead and the third platen to assume an extended piston rod position when the toggle mechanisms are in the toggle position and the mold portions are locked up.

* * * * *

UNITED STATES PATENT OFFICE
CERTIFICATE OF CORRECTION

Patent No. 4,088,432                     Dated May 9, 1978

Inventor(s)    Robert E. Farrell

It is certified that error appears in the above-identified patent and that said Letters Patent are hereby corrected as shown below:

Column 4, line 62, "moldclosed" should be --mold-closed--.

Column 8, line 60, "claim 12" should be --claim 14--.

Signed and Sealed this

Fourteenth Day of November 1978

[SEAL]

Attest:

RUTH C. MASON
Attesting Officer

DONALD W. BANNER
Commissioner of Patents and Trademarks